(12) United States Patent
Mercer et al.

(10) Patent No.: US 11,394,297 B2
(45) Date of Patent: Jul. 19, 2022

(54) PREVENTING INTER-LOOP INTERFERENCE IN A MULTI-FEEDBACK LOOP SYSTEM

(71) Applicant: Dialog Semiconductor (UK) Limited, London (GB)

(72) Inventors: Mark Mercer, Phoenix, AZ (US); Karthik Jayaraman, Chandler, AZ (US)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 17/106,874

(22) Filed: Nov. 30, 2020

(65) Prior Publication Data

US 2022/0173656 A1 Jun. 2, 2022

(51) Int. Cl.
*H02M 3/155* (2006.01)
*H02M 1/08* (2006.01)
*H02M 1/00* (2006.01)
*H02M 3/156* (2006.01)

(52) U.S. Cl.
CPC .......... *H02M 3/155* (2013.01); *H02M 1/0048* (2021.05); *H02M 1/08* (2013.01); *H02M 3/156* (2013.01)

(58) Field of Classification Search
CPC .............................. H02M 3/155; H02M 3/156
USPC .................................................. 323/284, 285
See application file for complete search history.

(56) References Cited

U.S. PATENT DOCUMENTS

| | | | |
|---|---|---|---|
| 4,786,878 A | 11/1988 | Botti | |
| 6,100,667 A | 8/2000 | Mercer | |
| 6,104,170 A * | 8/2000 | Lenk | H02J 7/00 |
| | | | 320/163 |
| 7,518,348 B1 | 4/2009 | Kobayashi | |
| 7,671,575 B1 * | 3/2010 | Suzuki | H05B 45/3725 |
| | | | 323/285 |
| 7,706,155 B1 | 4/2010 | Bell | |

(Continued)

OTHER PUBLICATIONS

German Office Action, File No. 10 2021 202 895.0, Applicant: Dialog Semiconductor (UK) Limited, dated Jul. 20, 2021, 5 pages.

(Continued)

*Primary Examiner* — Gary A Nash
(74) *Attorney, Agent, or Firm* — Saile Ackerman LLC; Stephen B. Ackerman

(57) ABSTRACT

The present document relates to power converters with multiple feedback loops. The present document relates to a power converter with at least two feedback loops. The power converter may comprise a first error amplifier and a first capacitive element. The power converter may comprise a second error amplifier and a second capacitive element, wherein the second error amplifier is configured to generate, based on a second reference value and a second feedback signal, a second error current for charging the second capacitive element. The power converter may comprise a selector circuit configured to generate a selection signal by comparing a first voltage of the first capacitive element and a second voltage of the second capacitive element. The power converter may comprise a first track amplifier circuit configured to establish an additional current path from a supply rail to the first capacitive element for accelerated charging of said first capacitive element.

34 Claims, 9 Drawing Sheets

(56) References Cited

U.S. PATENT DOCUMENTS

| | | | |
|---|---|---|---|
| 9,660,538 B2 | 5/2017 | Wu | |
| 9,831,687 B2 | 11/2017 | Tsai et al. | |
| 9,831,697 B2 | 11/2017 | Kung | |
| 9,831,768 B2* | 11/2017 | Lam | H02M 3/1588 |
| 9,876,473 B2 | 1/2018 | Khesbak | |
| 9,929,653 B1 | 3/2018 | Mercer | |
| 10,090,763 B1 | 10/2018 | Mercer | |
| 10,180,695 B1* | 1/2019 | Bikulcius | G05F 1/468 |
| 10,554,124 B1 | 2/2020 | Mangudi | |
| 10,666,139 B1* | 5/2020 | Zhang | H02M 3/156 |
| 2005/0275388 A1* | 12/2005 | Takimoto | H02M 3/335 |
| | | | 323/272 |
| 2008/0238387 A1 | 10/2008 | Schmeller | |
| 2009/0146634 A1* | 6/2009 | Audy | H02M 3/156 |
| | | | 323/290 |
| 2011/0095732 A1* | 4/2011 | Park | G05F 1/70 |
| | | | 323/207 |
| 2013/0207631 A1* | 8/2013 | Hirakawa | H02M 3/156 |
| | | | 323/283 |
| 2016/0187902 A1 | 6/2016 | Zeng | |
| 2017/0271987 A1 | 9/2017 | Yu | |
| 2017/0358984 A1 | 12/2017 | Unno | |
| 2018/0004241 A1 | 1/2018 | Wang | |
| 2018/0337599 A1 | 11/2018 | Chen | |
| 2018/0351455 A1 | 12/2018 | Fan | |
| 2021/0044204 A1 | 2/2021 | Kesterson | |
| 2021/0226596 A1 | 7/2021 | Chen | |
| 2021/0373586 A1 | 12/2021 | Takano | |

OTHER PUBLICATIONS

German Office Action, File No. 10 2021 202 896.9, Applicant: Dialog Semiconductor (UK) Limited, dated Jul. 20, 2021, 5 pages.

Co-Pending U.S. Appl. No. 17/106,837, filed: Nov. 30, 2020, "Adaptive Error Amplifier Clamping in a Multi-Feedback Loop System," by Mark Mercer et al., 24 pages.

"Li-Ion Battery Charger with Smooth-Switch-Over Four-Stage Control," by Yueming Sun et al., Proceedings of the 2009 12th International Symposium on Integrated Circuits, Dec. 14-16, 2009, pp. 49-52.

"Li-Ion Battery Charger with Three-Parameter Regulation Loop," by Elena E. Potanina et al., 2005 IEEE 36th Power Electronics Specialists Conference, Jun. 16, 2005, pp. 2836-2840.

"A Magnetically Coupled Feedback-Clamped Optimal Bidirectional Battery Charger," by R. K. Singh et al., IEEE Transactions on Industrial Electronics (vol. 60, Issue: 2, Feb. 2013), Feb. 3, 2012, pp. 422-432.

U.S. Notice of Allowance, U.S. Appl. No. 17/106,837, Applicant: Mercer et al., dated Jan. 24, 2022, 25 pages.

\* cited by examiner

PREVENTING INTER-LOOP INTERFERENCE IN A MULTI-FEEDBACK LOOP SYSTEM

RELATED PATENT APPLICATION

This application is related to U.S. patent application Ser. No. 17/106,837, filed on Nov. 30, 2020, which is owned by a common assignee, and which is herein incorporated by reference in their entirety.

TECHNICAL FIELD

The present document relates to power converters. In particular, the present document relates to power converter systems comprising two or more feedback loops.

BACKGROUND

Power converter systems are designed to maintain a well-regulated output, while maintaining high operating efficiencies. Further, output regulation is required to be maintained under a wide range of operating conditions, including but not limited to input voltage and output load conditions. FIG. 1 illustrates an example of a two feedback system where—depending on the operating conditions—one of the two feedback circuits is selected to provide an error signal to the pulse width modulation (PWM) logic.

Power converter systems utilizing multiple feedback loop circuits meet these stringent requirements, as each feedback loop is optimized for a particular operating condition. The operating condition is monitored, and the most suitable feedback loop is selected to provide the error signal to the modulation controller. For multi-feedback systems, there are a number of key factors to consider. Firstly, the most suitable feedback loop should be selected based on the current operating condition. Secondly, the system should adaptively transition from one feedback loop to another. And thirdly, the system should ensure that the transitions do not create adverse conditions, such as e.g. extreme under-shoots or over-shoots, or loop instability.

For changes in operating conditions that are relatively small in magnitude and slow in time, these factors do not present significant challenges. However, today's portable equipment requires low power consumption and high performance. This places an enormous burden on the power converter system as it is faced with dynamic load changes that are severe both from a magnitude and slew rate perspective.

SUMMARY

The present document addresses the above-mentioned technical problems. Specifically, the present document addresses the technical problem of providing a multi-feedback loop power converter which minimizes the risk of a regulated parameter to deviate outside its specified accuracy limit when the system is exposed to rapid changes in operating conditions. More specifically, it is an object of the present document to prevent unintended interaction between different feedback loops which may lead to current or voltage overshoots/undershoots.

According to an aspect, a power converter is presented. The power converter may comprise a first error amplifier and a first capacitive element, wherein the first error amplifier is configured to generate, based on a first reference value and a first feedback signal, a first error current for charging the first capacitive element. The power converter may comprise a second error amplifier and a second capacitive element, wherein the second error amplifier is configured to generate, based on a second reference value and a second feedback signal, a second error current for charging the second capacitive element. The power converter may comprise a selector circuit configured to generate a selection signal by comparing a first voltage of the first capacitive element and a second voltage of the second capacitive element. The power converter may comprise a first track amplifier circuit configured to establish an additional current path from a supply rail to the first capacitive element for accelerated charging of said first capacitive element.

The power converter may comprise a first feedback circuit which comprises the first error amplifier. For instance, the first feedback circuit may be configured to derive the first feedback signal directly or indirectly from an output voltage or an output current of the power converter. Alternatively, or additionally, the first feedback circuit may be configured to derive the first feedback signal directly or indirectly from an input voltage or an input current of the power converter.

The power converter may comprise a second feedback circuit which comprises the second error amplifier. For instance, the second feedback circuit may be configured to generate the second feedback signal, which may be different from the first feedback signal. Again, the second feedback signal may be derived from one or more of: the input voltage, the input current, the output voltage, and the output current of the power converter.

The described power converter may be used e.g. in a battery charging device. For example, the first feedback circuit may be configured to regulate a constant output voltage of the power converter during a constant voltage (CV) mode of operation. During the CV mode, the output current may be variable. The second feedback circuit may be configured to regulate a constant output current of the power converter during a constant current (CC) mode of operation. During the CC mode, the output voltage may be variable.

The power converter may also comprise a second track amplifier circuit configured to establish an additional current path from the supply rail to the second capacitive element for accelerated charging of said second capacitive element. In general, the power converter may comprise a plurality of feedback circuits, each with an error amplifier, a capacitive element, and a track amplifier circuit for accelerated charging of the respective capacitive element. By using dedicated track amplifier circuits to augment the error currents, varying bandwidths (i.e. response speeds) of the feedback circuits may be compensated and all capacitive elements may be charged with the similar charging rates, thereby preventing unintended switching between different feedback circuits when the power converter is exposed to rapid changes in the operating conditions.

For example, the first error amplifier may be configured to generate the first error current based on a difference between the first reference value and the first feedback signal. Analogously, the second error amplifier may be configured to generate the second error current based on a difference between the second reference value and the second feedback signal.

For example, a first terminal of the first capacitive element may be coupled to an output of the first error amplifier. More specifically, the power converter may comprise a compensation resistor coupled between the output of the first error amplifier and the first terminal of the first capacitive element. The first terminal of the first capacitive element may also be coupled to an input of the selector circuit (for example if no compensation resistor is provided). Again, the compensation resistor may be coupled between the first terminal of the first capacitive element and the input of the selector circuit. A second terminal of the first capacitive element may be connected to a reference potential such as e.g. ground.

Analogously, a first terminal of the second capacitive element may be coupled to an output of the second error amplifier. The first terminal may also be coupled to an input of the selector circuit. A second terminal of the second capacitive element may be connected to a reference potential.

Throughout this document, the term "reference potential" is meant in its broadest possible sense. In particular, the reference potential is not limited to ground i.e. a reference potential with a direct physical connection to earth. Moreover, the reference potential is not limited to a potential/voltage of 0V. Rather, the term "reference potential" may refer to any reference point to which and from which electrical currents may flow or from which voltages may be measured. Moreover, it should be mentioned that the reference potentials mentioned in this document may not necessarily refer to the same physical contact. Instead, the reference potentials mentioned in this document may relate to different physical contacts although reference is made to "the" reference potential for ease of presentation.

The first error amplifier may be a voltage controlled current source (VCCS) such as e.g. an operational transconductance amplifier (OTA). That is, the first reference value may be a first reference voltage value, and the first feedback signal may be a first feedback voltage. Similarly, the second error amplifier may be a VCCS such as e.g. an OTA, the second reference value may be a second reference voltage value, and the second feedback signal may be a second feedback voltage.

The first and the second capacitive element may be e.g. capacitors or other devices capable of storing electrical energy in an electric field.

The first track amplifier circuit may be configured to not establish the additional current path from the supply rail to the first capacitive element if the selection signal indicates that the first error current is used to control a power stage of the power converter. Alternatively or additionally, the first track amplifier circuit may be configured to establish the additional current path from the supply rail to the first capacitive element if a difference between the first reference value and the first feedback signal exceeds a predetermined activation threshold. To be more specific, the first track amplifier circuit may be configured to only establish the additional current path if the difference between the first reference value and the first feedback signal exceeds the predetermined activation threshold, and to not establish the additional current path if the difference between the first reference value and the first feedback signal does not exceed the predetermined activation threshold.

The first track amplifier circuit may comprise a charging transistor coupled between the supply rail and the first capacitive element. Depending on a control signal applied to a control terminal of the charging transistor, the charging transistor may be configured to connect the supply rail to the first capacitive element for accelerated charging of the first capacitive element, or to isolate the supply rail from the first capacitive element to interrupt accelerated charging of the first capacitive element. As already discussed in the foregoing description, interruption of the accelerated charging may become necessary when the feedback loop associated with the first capacitive element is currently selected by the selector circuit to control the power stage of the power converter. Moreover, interruption of the accelerated charging may be advantageous when a signal difference at the input of the first error amplifier is smaller than the predetermined activation threshold.

The charging transistor may be e.g. a CMOS transistor. More specifically, the charging transistor may be a p-type CMOS transistor. The control terminal of the charging transistor may be the gate of the charging transistor, and a controlled section of the charging transistor may be coupled between the supply rail and the first capacitive element. For instance, the source of the charging transistor may be coupled to the supply rail, and the drain of the charging transistor may be coupled to the first capacitive element. The charging transistor may be operated as a switch such that either a high-ohmic or a low-ohmic electrical connection is established between the drain and the source of the charging transistor, i.e. the charging transistor may be configured to be either turned on or off. Alternatively, the charging transistor's active mode of operation may also be in saturation (i.e., linear or analog mode) rather than in triode/cutoff (i.e., as an on or off switch). In other words, the tracking amplifier (including the charging transistor and its controlling amplifier) may also operate as a linear amplifier when it is active.

The first track amplifier circuit may further comprise an amplifier. An output of the amplifier may be coupled to a control terminal of the charging transistor. A voltage indicative of the first error current may be applied to a first input of the amplifier. A voltage associated with the predetermined activation threshold may be applied to a second input of the amplifier. The voltage associated with the predetermined activation threshold may be generated by a voltage source which is coupled to the second input of the amplifier.

The first track amplifier circuit may comprise a current controlled current source CCCS and a resistive element. For instance, the CCCS may be implemented using a current mirror. An input current of this current mirror may be the output current of the error amplifier. The first track amplifier circuit may be configured to generate the voltage indicative of the first error current by—in a first step—generating, using the CCCS, an intermediate current associated with the first error current, and—in a second step—translating, using the resistive element of the first track amplifier circuit, said intermediate current into said voltage indicative of the first error current.

The power converter may further comprise a first clamp circuit configured to limit the first voltage of the first capacitive element to a first threshold value. For example, the first clamp circuit may be an upper clamp circuit configured to limit the first voltage such that the first voltage does not exceed the first threshold value. At the same time, the first clamp circuit may be configured to neither limit nor influence the first voltage when the error signal is below the first threshold value.

Alternatively, the first clamp circuit may be a lower clamp circuit configured to limit the first voltage such that the first voltage does not fall below the first threshold value. At the same time, the first clamp circuit may be configured to neither limit nor influence the first voltage when the error signal is larger than the first threshold value.

The first clamp circuit may comprise a clamp transistor coupled between the first capacitive element and a reference potential. The first clamp circuit may comprise an error amplifier coupled to a control terminal of the clamp transistor. The error amplifier may be configured to compare the first voltage of the first capacitive element and the first threshold value. The error amplifier may be configured to generate an analog, continuous control signal for controlling the control terminal of the clamp transistor based on an amplified difference between the first voltage of the first capacitive element and the first threshold value.

The first track amplifier circuit may be configured to interrupt the additional current path from the supply rail to the first capacitive element when the first clamp circuit limits the first voltage of the first capacitive element to the first threshold value. By interrupting the additional current path, overloading of the supply rail may be prevented when the first voltage of the first capacitive element attempts to exceed the first threshold value and the first clamp circuit is actively limiting the first voltage of the first capacitive element to the stay at the first threshold value.

The first track amplifier circuit may further comprise a current mirror and another transistor. A first branch of the current mirror may be coupled between the supply rail and the control terminal of the charging transistor. A second branch of the current mirror may be coupled on a current path from the supply rail, via a controlled section of the another transistor to a reference potential. A control terminal of the another transistor may be coupled to the control terminal of the clamp transistor of the first clamp circuit.

The power converter may further comprise a first threshold value generator circuit configured to generate the first threshold value dependent on the first error current. The first threshold value generator circuit may be configured to generate the first threshold value such that the first threshold value increases when the first error current increases. For example, the first threshold value may be a first threshold voltage, and the first error current may depend on a difference between a first feedback voltage (representing the first feedback signal) and a first reference voltage (representing the first reference value). In other words, the first error amplifier may be a voltage controlled current source (VCCS) such as e.g. an operational transconductance amplifier (OTA). The first threshold value generator unit may then be configured to increase the first threshold voltage if the first error current increases, and to decrease the first threshold voltage if the first error current decreases.

The first threshold value generator circuit may be configured to generate the first threshold value such that the first threshold value is proportional to the first error current.

The first threshold value generator circuit may comprise a current mirror configured to generate a mirror current based on the first error current. The first threshold value generator circuit may comprise a resistive element configured to translate said mirror current into the first threshold value. The current mirror may be e.g. based on CMOS technology or based on bipolar technology. For example, the current mirror may comprise a first mirror transistor configured to translate the first error current into a corresponding voltage, and a second mirror transistor configured to translate said corresponding voltage into the mirror current. The resistive element may be e.g. any sort of resistor, or a diode-connected transistor. The resistive element may be coupled between an output of the selector circuit and the first clamp circuit.

The power converter may further comprise an additional reference current source coupled to said resistive element. With the help of said additional reference current source, it becomes possible to add a constant offset voltage to the first threshold value which may be, in addition to said constant offset voltage, linearly dependent on the first error current.

The current mirror may be connected to said resistive element such that the mirror current flows through said resistive element and generates a voltage difference between the output of the selector circuit and the first clamp circuit. The selector circuit may be configured to generate, at an output of the selector circuit, an output voltage representing the generated selection signal. In other words, said output voltage may be associated with the selected error signal, i.e. either the first or the second error signal. The voltage difference generated by the resistive element may then add to (or subtract from) said output voltage at the output of the selector circuit, and may serve as the first threshold value which is provided to the first clamp circuit.

The selector circuit may comprise a unity gain amplifier. The first voltage of the first capacitive element may be applied to a first non-inverting input of the unity gain amplifier. The second voltage of the second capacitive element may be applied to a second non-inverting input of the unity gain amplifier. An output signal of the unity gain amplifier may be feedback to an inverting input of the unity gain amplifier. In other words, the open loop gain of the selector amplifier may be very high, but the closed loop gain may be unity due to the feedback. Preferably, the selector circuit may only propagate the input signal that has the lowest value. The other signals may be processed by the amplifier.

The power converter may further comprise a modulator circuit configured to generate, based on the selection signal, one or more control signals for controlling a power stage of the power converter. The power converter may further comprise a high-side switching element, a low-side switching element, and an inductor. The high-side switching element may be coupled to a switching node. The low-side switching element may be coupled between the switching node and a reference potential. The inductor may be coupled to the switching node.

The high-side switching element, the low-side switching element, and the inductor may form part of the power stage of the power converter. Depending on the type of the power converter, the switching elements and the inductor may be arranged in different ways. For example, the power converter may be a buck-type power converter configured to down-convert an input voltage of the power converter into a lower output voltage of the power converter. At the same time, an output current of the buck-type power converter may be larger than an input current of the buck-type power converter. In this scenario, the high-side switching element may be coupled between the input of the power converter and the switching node, and the inductor may be coupled between the switching node and the output of the power converter.

As another example, the power converter may be a boost-type power converter configured to up-convert the input voltage of the power converter to a larger output voltage of the power converter. In this case, the output current of the boost-type power converter may be smaller than the input current of the boost-type power converter. The inductor may be coupled between the input of the power converter and the switching node, and the high-side switching element may be coupled between the switching node and the output of the power converter. Of course, the power converter may be also a buck-boost power converter, or any other power converter with a related converter topology.

Each of the switching elements may be implemented with any suitable device, such as, for example, a metal-oxide-semiconductor field effect transistor (MOSFET), an insulated-gate bipolar transistor (IGBT), a MOS-gated thyristor, or any other suitable power device. Each switching element may have a control terminal to which a respective driving voltage or control signal may be applied to turn the switching element on (i.e. to close the switching element) or to turn the switching element off (i.e. to open the switching element).

According to another aspect, a method of operating a power converter is described. The method may comprise steps which correspond to the functional features of the power converter described in the present document. In particular, the power converter may comprise a first error amplifier, a first capacitive element, a second error amplifier, a second capacitive element, a selector circuit, and a first track amplifier circuit. The method may comprise generating, by the first error amplifier, based on a first reference value and a first feedback signal, a first error current for charging the first capacitive element. The method may comprise generating, by the second error amplifier, based on a second reference value and a second feedback signal, a second error current for charging the second capacitive element. The method may comprise generating, by the selector circuit, a selection signal by comparing a first voltage of the first capacitive element and a second voltage of the second capacitive element. The method may comprise establishing, by the first track amplifier circuit, an additional current path from a supply rail to the first capacitive element for accelerated charging of the first capacitive element.

The method may comprise not establishing the additional current path from the supply rail to the first capacitive element if the selection signal indicates that the first error current is used to control a power stage of the power converter. The method may comprise establishing the additional current path from the supply rail to the first capacitive element if a difference between the first reference value and the first feedback signal exceeds a predetermined activation threshold.

The method may comprise providing a charging transistor coupled between the supply rail and the first capacitive element. The first track amplifier circuit may further comprise an amplifier. The method may comprise coupling an output of the amplifier to a control terminal of the charging transistor. The method may comprise applying a voltage indicative of the first error current to a first input of the amplifier. The method may comprise applying a voltage associated with the predetermined activation threshold to a second input of the amplifier.

The first track amplifier circuit may comprise a current controlled current source CCCS and a resistive element. The method may comprise generating the voltage indicative of the first error current by (a) generating, using the CCCS, an intermediate current associated with the first error current, and (b) translating, using the resistive element, said intermediate current into said voltage indicative of the first error current.

The method may comprise limiting, by a first clamp circuit, the first voltage of the first capacitive element to a first threshold value. The method may comprise coupling a transistor between the first capacitive element and a reference potential. The method may comprise coupling an error amplifier to a control terminal of the transistor, wherein the error amplifier is configured to compare the first voltage of the first capacitive element and the first threshold value.

The method may comprise interrupting the additional current path from the supply rail to the first capacitive element when the first clamp circuit limits the first voltage of the first capacitive element to the first threshold value. The first track amplifier circuit may further comprise a current mirror and another transistor. The method may comprise coupling a first branch of the current mirror between the supply rail and the control terminal of the charging transistor. The method may comprise coupling a second branch of the current mirror on a current path from the supply rail, via a controlled section of the another transistor to a reference potential. The method may comprise coupling a control terminal of the another transistor to the control terminal of the transistor of the first clamp circuit.

The method may comprise generating, by a first threshold value generator circuit, the first threshold value dependent on the first error current. In particular, the method may comprise generating, by the first threshold value generator circuit, the first threshold value such that the first threshold value increases when the first error current increases. The method may comprise generating, by a current mirror, a mirror current based on the first error current. The method may comprise translating, by a resistive element, said mirror current into the first threshold value. The method may comprise coupling the latter resistive element between an output of the selector circuit and the first clamp circuit.

The selector circuit may comprise a unity gain amplifier. The method may comprise applying the first voltage of the first capacitive element to a first non-inverting input of the unity gain amplifier. Alternatively, the compensation resistor may be coupled to the selector circuit. In general, the voltage of the compensation network (e.g., the compensation resistor and the capacitor) may be applied to the input of the selector circuit. The method may comprise applying the second voltage of the second capacitive element to a second non-inverting input of the unity gain amplifier. The method may comprise feedbacking an output signal of the unity gain amplifier to an inverting input of the unity gain amplifier.

The method may comprise generating, by a modulator circuit, based on the selection signal, one or more control signals for controlling a power stage of the power converter. The power converter may further comprise a high-side switching element, a low-side switching element, and an inductor. The method may comprise coupling the high-side switching element to a switching node. The method may comprise applying the low-side switching element between the switching node and a reference potential. The method may comprise applying the inductor to the switching node.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which.

DETAILED DESCRIPTION

Figure 1:
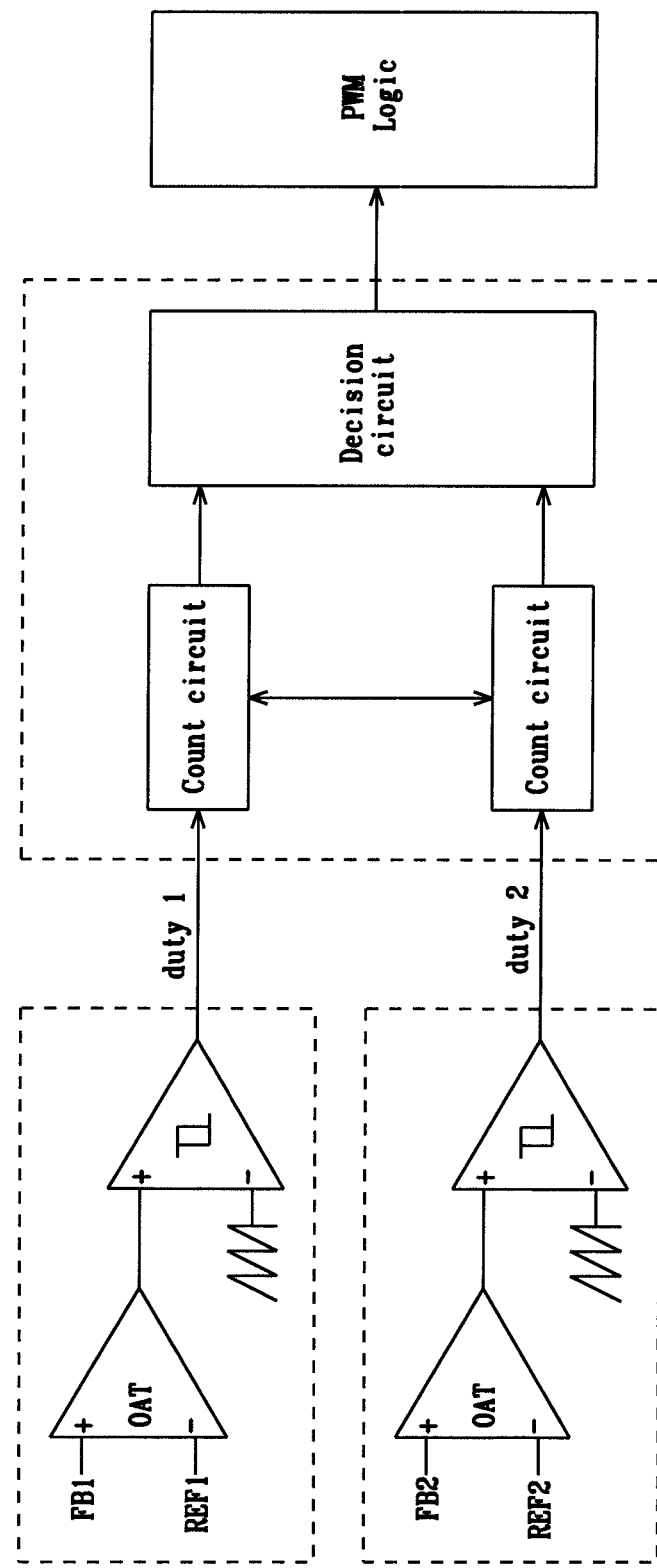
FIG. 1 shows an example of a power converter with two feedback loops.
Figure 2:
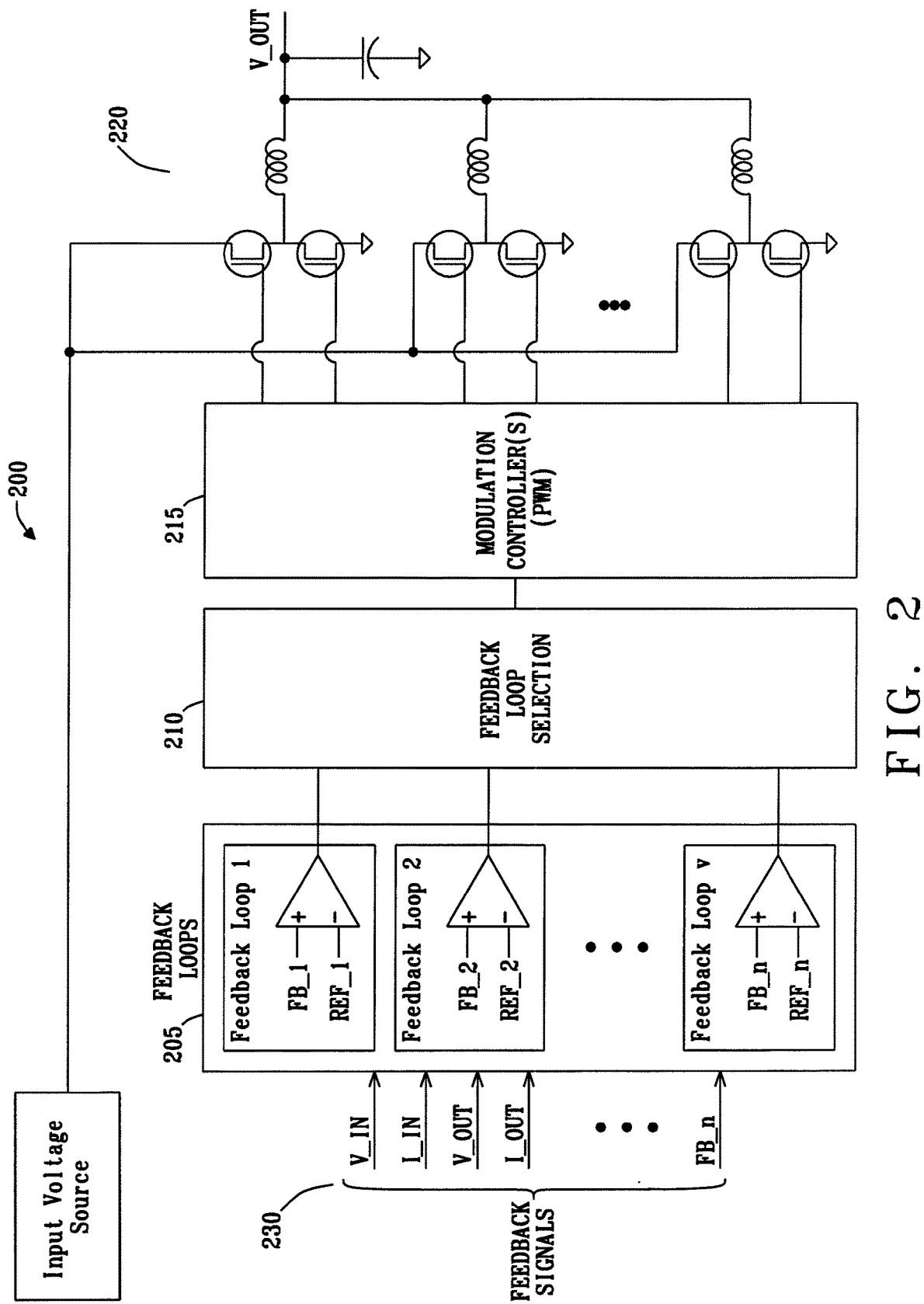
FIG. 2 shows an example of a power converter with a plurality of feedback loops.

FIG. 2 shows an example of a power converter 200 with a plurality of feedback loops 205, represented by feedback loops 1, 2, and n. The input to the feedback loops is a number of feedback signals 230. The outputs of the feedback loops 205 are input to the feedback loop selection block (selector circuit) 210. Once the appropriate feedback loop is determined, the feedback signal is input to the modulation controller(s) (modulator circuit) 215, which provide the control signals to the power stage(s) 220 in order to provide output regulation.

Figure 3:
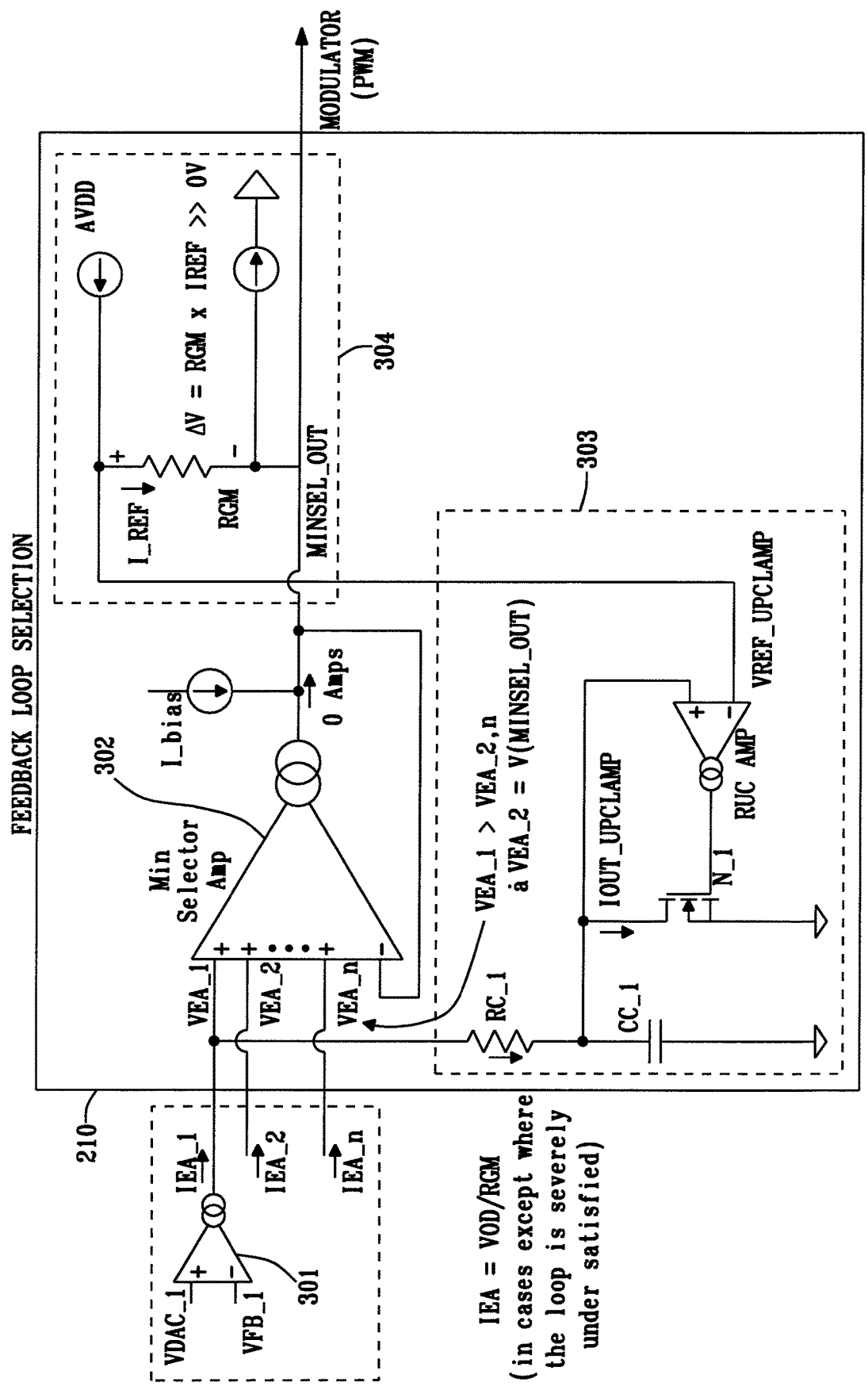
FIG. 3 shows an exemplary implementation of an error amplifier, a selector circuit, a clamp circuit, and a threshold generator circuit.

For the purposes of this invention, we will focus on the feedback loops and the feedback loop selection functions. FIG. 3 shows a detailed illustration of the feedback selection block 210 of FIG. 2. To be more specific, FIG. 3 shows an exemplary implementation of an error amplifier 301, a minimum selector circuit 302, a clamp circuit 303, and a threshold generator circuit 304. For the feedback signals that are not currently controlling the modulator controller 215, the regulation parameter, represented by FB_1, FB_2, FB_n, may be lower than the reference voltages VDAC_1, VDAC_2 and VDAC_n, respectively. In general, the feedback signal (FB_n) may be applied to the non-inverting input of the error amplifier 301 so that the objective of the overall loop is to prevent the feedback signal from falling below the reference voltage. All feedback loops may have a similar structure. When feedback loop 1 is not in control, the error amplifier 301 for feedback loop 1 may source current IEA_1 into the compensation network RC_1 and CC_1. The current IEA for the feedback loop whose control signal is currently being used to modulate the power stages (e.g. feedback loop 2) may be OA in steady state. For example, if the control signal from loop 2 was selected to be used to modulate the power stage, current IEA_2 may equal OA. Further, the output signal voltage of the error amplifier of feedback loop 2, VEA_2 as well as the voltage of the Min Selector Amplifier (MINSEL_OUT) may be less than the voltages VEA of all other feedback loops. As a consequence, the following equations hold: VEA_2<VEA_1, n and MINSEL_OUT<VEA_1, n. When VEA_Loop1≥MINSEL_OUT+RGM*IREF, the relative upper clamp (RUC) amplifier diverts current IEA_1 to prevent the capacitive element CC_1 from charging more than necessary. This operation may be repeated for all feedback loops that are not currently selected. In order to prevent the error signals from the feedback loops that are currently not selected to inadvertently interfere with the error signal of the feedback loop that is currently selected, the offset voltage IREF*RGM should be chosen substantially larger than 0V such as 200 mV, for example.

Although choosing a relatively large offset voltage IREF*RGM>>0 ensures that feedback signals from unselected feedback loops will not interfere with the selected control signal, it may have a significant disadvantage. When operating conditions change such that a transition from one feedback to another is required, IREF*RGM>>0 creates a long transition delay, as the voltage VEA of a newly desired feedback loop will need to fall below the voltage VEA of the currently active feedback loop in order to take over control.

Long transitions from one feedback loop to another create a delay of the power supply's ability to respond to sudden changes of the operating conditions. For example, let us assume that the output load was at a no-load or light load condition and was subjected to a significant dynamic load change to maximum load. It may be desirable to limit the input current overshoot, requiring a change in the "in-control" feedback loop. The delay in transitioning to the feedback loop optimized for regulating input current parameters may limit the ability to respond.

In conclusion, multi-feedback loop power converter systems such as a battery charger can regulate one of several parameters as the operating conditions require. Further, assurances must be made to prevent the interference of control signals from non-selected feedback loops. In order to maintain a singular control signal, FIG. 3 shows the implementation of a fixed guard-band for unselected feedback loops. However, this guard-band introduces a delay during the transition from one feedback loop to another. These delays have a negative impact on output regulation, especially when there is a sharp change in the operating conditions.

What is needed in the art is a method for ensuring that multi-loop regulators expedite the transition of one control loop to another to reduce regulation transient errors.

The current invention describes a power converter system which preserves all of the benefits of prior art multi-feedback loop systems. It improves on prior art systems by minimizing the delay time of transitioning from one feedback loop to another. The reduction of the transition delay improves system performance, especially critical in high performance power supply systems. The transition delay is achieved while maintaining assurances that non-selected feedback loops would not interfere with the feedback signal of the selected feedback loop.

To reiterate a key concept, in order for a feedback loop to take control, the differential input overdrive voltage (VOD=VDAC−VFB) of that loop may be required to fall to 0V or become negative, and the voltage VEA signal must move down to the MINSEL_OUT level. For example, the VOD must be negative enough in order to generate a voltage change in the compensation network that can be as much as IREF*RGM. The more VOD falls below 0V, the greater the feedback voltage VFB is above the regulation target of VDAC (which may correspond to an overshoot condition).

Figure 4:
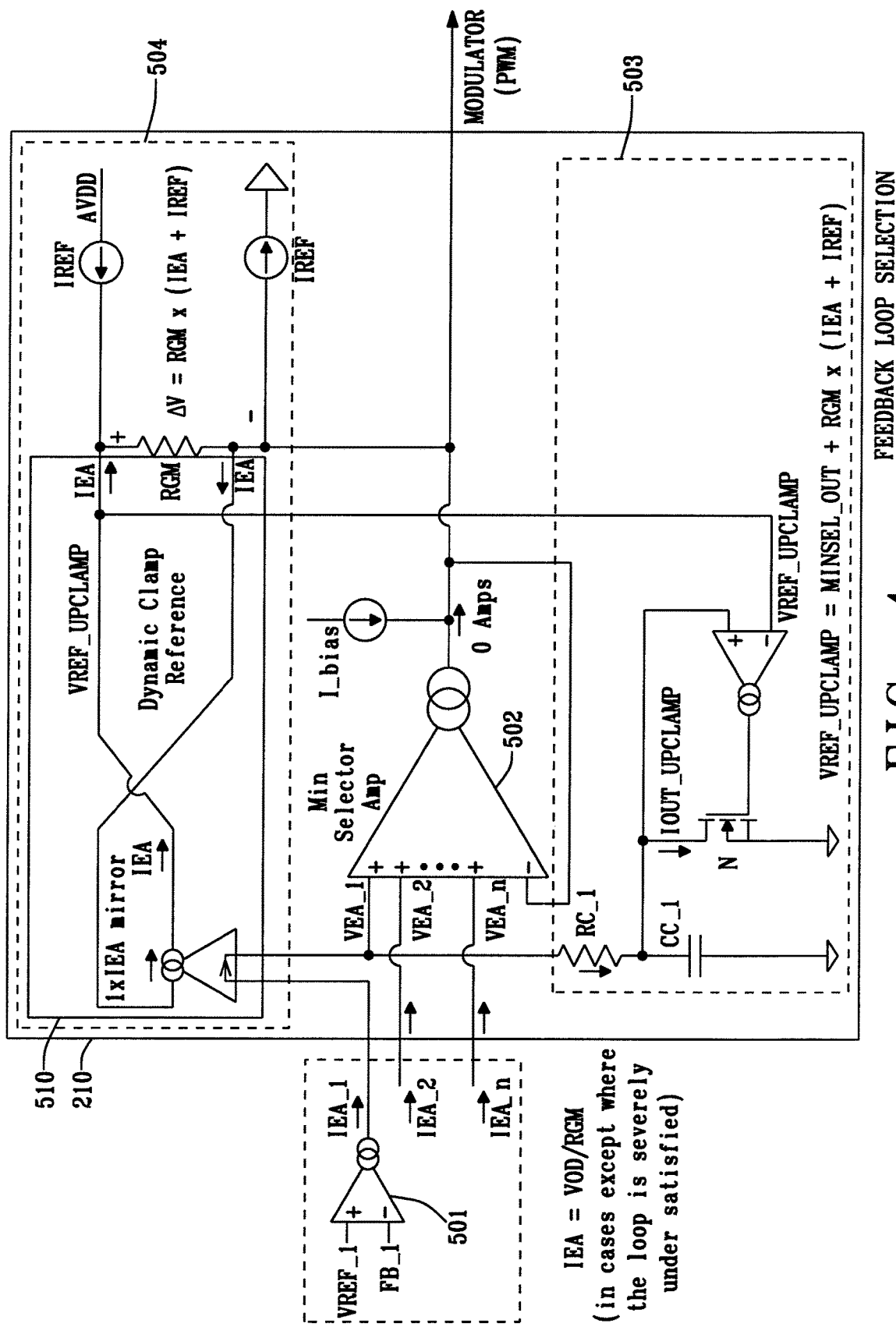
FIG. 4 shows another exemplary implementation of an error amplifier, a selector circuit, a clamp circuit, and a threshold generator circuit.

FIG. 4 shows another exemplary implementation according to the principles of the present invention. FIG. 4 shows an error amplifier 501, a minimum selector circuit 502, a clamp circuit 503, and a threshold generator circuit 504. The illustrated circuit minimizes the feedback loop transition time by minimizing ΔV, i.e. (IREF*RGM). Minimizing ΔV reduces the overshoot of feedback voltage VFB when a rapid change occurs such as a sudden change in the output load. Further, another critical feature is that the circuit in FIG. 4 ensures VREF_UPCLAMP is sufficiently large so that none of the not actively controlling VEA signals unintentionally interfere with the in-control VEA signal (due to ripple, transient noise coupling, offsets, etc.) during steady-state operation.

As shown in FIG. 4, the threshold generator circuit 504 may comprise a mirror block 510 which may comprise a suitable current mirror for dynamically controlling ΔV by utilizing a mirror current of the feedback loop's output current, IEA, thus proportionally setting VREF_UPCLAMP to be proportional to VOD=VDAC-VFB. As the voltage VOD becomes increasingly more positive, the not-in-control loop's VEA signal is allowed to rise higher relative to MINSEL_OUT. This lowers the risk of unintentional loop interaction. Conversely, as the voltage VOD decreases, VREF_UPCLAMP decreases to allow for a faster loop transition. Since IEA supplements IREF, then IREF may be smaller than for the original relative clamp scheme discussed in the context of FIG. 3.

For both implementations shown in FIG. 3 and FIG. 4, precautions should be made to ensure that the control signal from the selected feedback loop is not impeded by a control signal from a non-selected feedback loop.

For example, consider a case where feedback loop_1 is selected and the voltage VEA_1 is used to control the power stage and the power converter is subjected rapid load increase. If VEA_1 controls the output voltage of the regulator, then a decrease in the output voltage will lead to an associated increase in the differential voltage VOD. Subsequently, the error amplifier output current, IEA_1, will increase and react with the compensation network causing the voltage VEA_Loop1 to suddenly increase by VOD1* (RC_1/RGM1).

Figure 5:
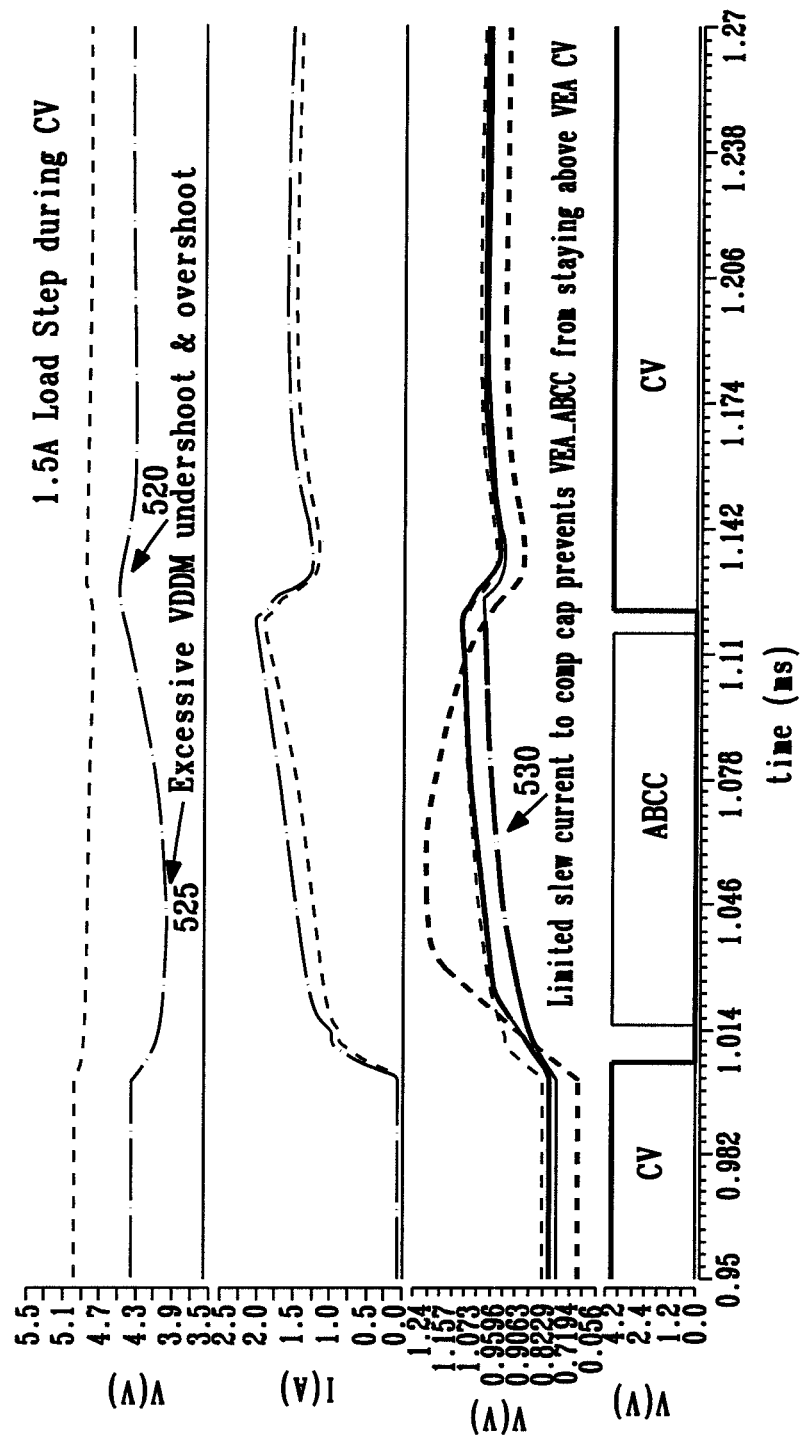
FIG. 5 shows simulation results with undesirable loop interactions.

A non-selected error signal, VEA_Loop2, may be higher than the voltage VEA_Loop1 prior to the operating condition step change. After the step change, the voltage VEA_Loop2 may not remain above VEA_Loop1 if the error current IEA_2 is too small. This will result in a relatively slow change in V(CC_2): ΔV/Δt=IEA_2/CC_2. Consequently, Loop2 will momentarily assume control of the buck regulation, leading to a degradation of the transient response for Loop1. Preferably, Loop1 should maintain in control of the buck before, during and after the operating point step change. FIG. 5 illustrates an example of unintended interference by a non-selected feedback loop, where 520 shows excessive overshoot on VDDM, 525 shows excessive undershoot on VDDM, and 530 shows where limited slew current to the compensation capacitor prevents VEA_ABCC from staying above VEA_CV.

Thus, what is further needed in the art is a method to prevent the control signal from the selected feedback loop from being superseded by a control signal from a non-selected feedback loop.

The current invention improves on prior art multi-feedback loop power converters by insuring that non-selected feedback loops do not interfere with the control signal of the selected feedback loop. Further, the invention describes a power converter system, which preserves all of the benefits of prior art multi-feedback loop systems.

Figure 6:
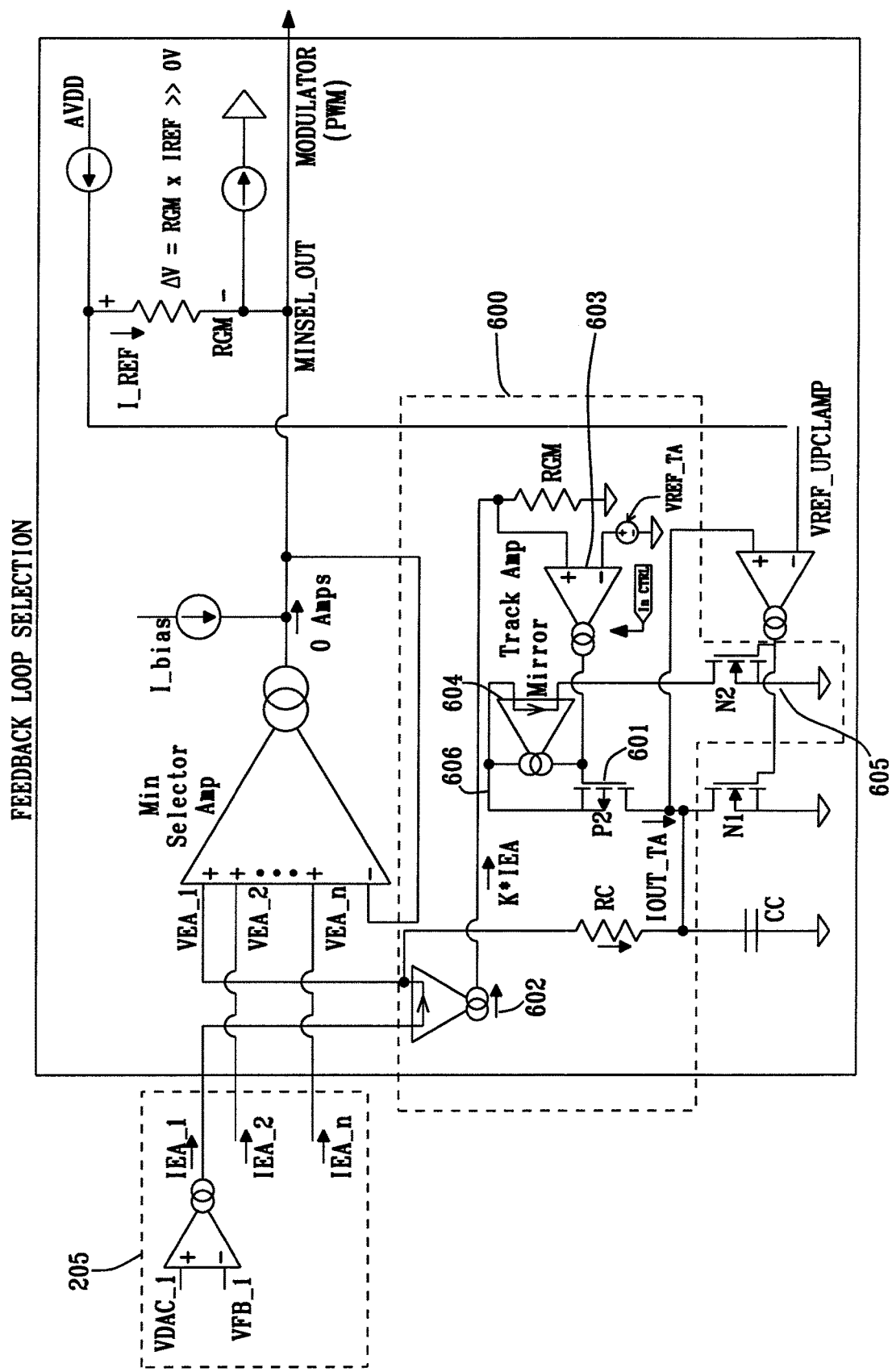
FIG. 6 shows components of a power converter with a track amplifier circuit.
Figure 7:
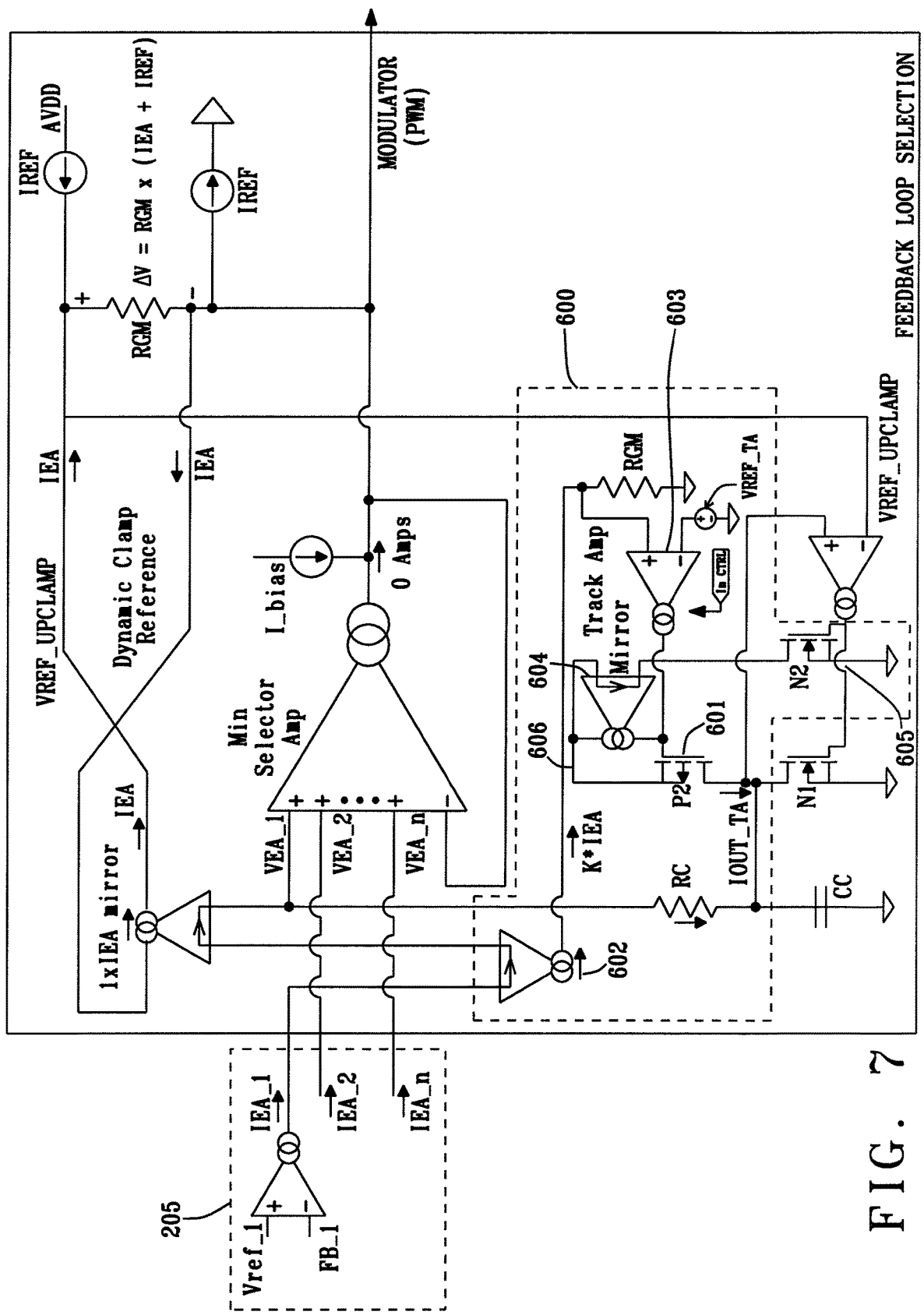
FIG. 7 shows alternative components of a power converter with a track amplifier circuit.

FIGS. 6 and 7 illustrate further non-limiting embodiments of the invention. FIG. 6 illustrates a track amplifier circuit 600 added to the block diagram from FIG. 3, and FIG. 7 illustrates a track amplifier circuit added to the block diagram from FIG. 4. In both cases, the exemplary track amplifier circuit comprises a charging transistor 601, a CCCS 602, an OTA 603, a current mirror 604, and an NMOS transistor 605. Dependent on the voltage difference (Vref_1−FB_1), the OTA 603 (first track amplifier) decides whether the charging transistor 601 establishes an additional current path from a supply rail 606 to the capacitive element CC for accelerated charging of said capacitive element CC.

To prevent loop interaction, the track amplifier circuit 600 is provided to slew the capacitive element CC for the loop that is not in-control (non-selected). The track amplifier circuit 600 is activated when the voltage K*IEA*RGM exceeds a predetermined threshold voltage, VREF_TA, which is provided by a voltage source. The error current IEA is proportional to the differential voltage VOD. Therefore, the predetermined threshold voltage VREF_TA may be designed to correspond to a specific VOD value (e.g., 10 mV). A second output signal from the clamp circuit may interact with the track amplifier circuit 600 to prevent V(CC) from rising above VREF_UPCLAMP.

Figure 8:
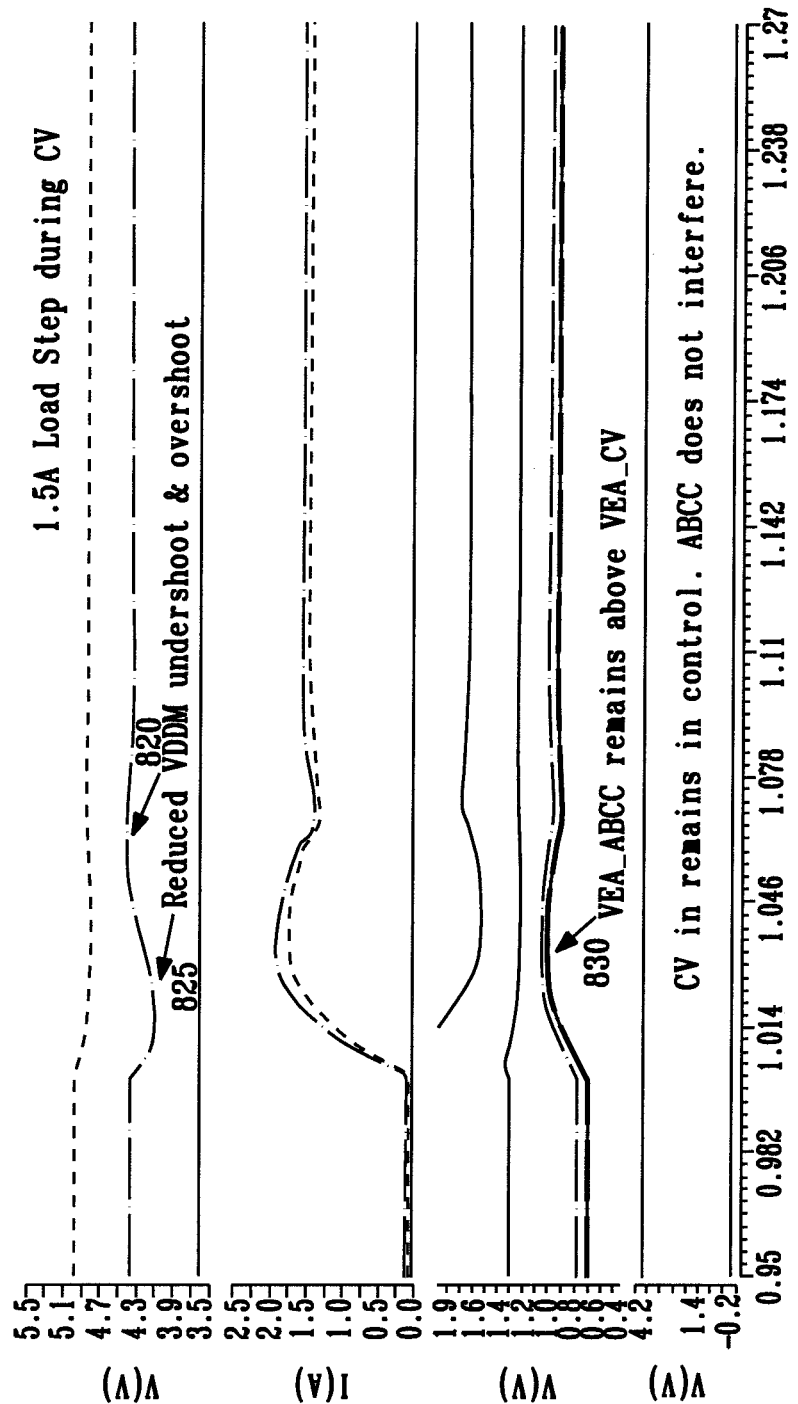
FIG. 8 shows simulation results without loop interactions.

FIG. 8 shows some exemplary waveforms of the invention, which may prevent a control signal from a non-selected feedback loop from interfering with the error signal from the selected feedback loop. As can be seen from FIG. 8, the capacitive elements are charged with a similar slew rate, where 820 shows excessive overshoot on VDDM, 825 shows excessive undershoot on VDDM, and 830 shows where VEA_ABCC remains above VEA_CV. As a consequence, the error voltages stored on the capacitive elements follow almost parallel lines and do not intersect, thereby effectively preventing unintended loop interactions.

In summary, the track amplifier circuit 600 may prevent the output of the not in-control error amplifier from interfering with the output signal of the error amplifier that is in-control. Furthermore, the track amplifier circuit 600 provides a means of controlling the tracking amplifier 603 so that it is activated only when the differential input signal, VOD, of the error amplifier exceeds a predetermined threshold (e.g., when VOD=VDAC−VFB>10 mV). The differential input overdrive of an error amplifier is also referred to as VOD in this document.

Figure 9:
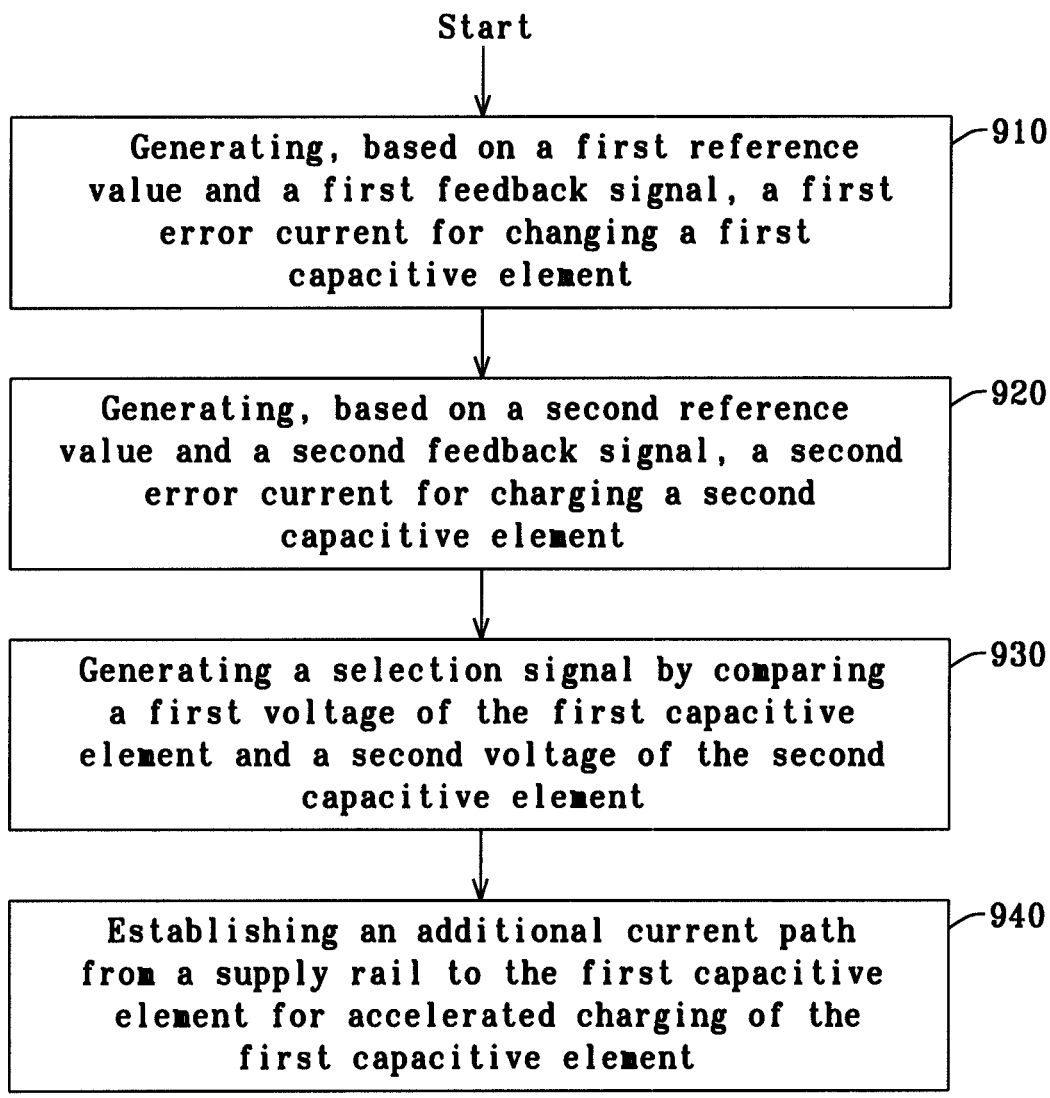
FIG. 9 shows a flowchart for a method of preventing inter-loop interference in a multi-feedback loop system.

FIG. 9 shows a flowchart for a method of preventing inter-loop interference in a multi-feedback loop system. The method may comprise 910, generating, by the first error amplifier, based on a first reference value and a first feedback signal, a first error current for charging the first capacitive element. The method may also comprise 920, generating, by the second error amplifier, based on a second reference value and a second feedback signal, a second error current for charging the second capacitive element. The method may also comprise 930, generating, by the selector circuit, a selection signal by comparing a first voltage of the first capacitive element and a second voltage of the second capacitive element. The method may also comprise 940, establishing, by the first track amplifier circuit, an additional current path from a supply rail to the first capacitive element for accelerated charging of the first capacitive element.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter comprising
   a first error amplifier and a first capacitive element, wherein the first error amplifier is configured to generate, based on a first reference value and a first feedback signal, a first error current for charging the first capacitive element,
   a second error amplifier and a second capacitive element, wherein the second error amplifier is configured to generate, based on a second reference value and a second feedback signal, a second error current for charging the second capacitive element,
   a selector circuit configured to generate a selection signal by comparing a first voltage of the first capacitive element and a second voltage of the second capacitive element, and
   a first track amplifier circuit configured to establish an additional current path from a supply rail to the first capacitive element for accelerated charging of said first capacitive element.

2. The power converter according to claim 1, wherein the first track amplifier circuit is configured to not establish the additional current path from the supply rail to the first capacitive element if the selection signal indicates that the first error current is used to control a power stage of the power converter.

3. The power converter according to claim 1, wherein the first track amplifier circuit is configured to establish the additional current path from the supply rail to the first capacitive element if a difference between the first reference value and the first feedback signal exceeds a predetermined activation threshold.

4. The power converter according to claim 3, wherein the first track amplifier circuit comprises a charging transistor coupled between the supply rail and the first capacitive element.

5. The power converter according to claim 4, wherein the first track amplifier circuit further comprises an amplifier, and wherein
   an output of the amplifier is coupled to a control terminal of the charging transistor,
   a voltage indicative of the first error current is applied to a first input of the amplifier, and
   a voltage associated with the predetermined activation threshold is applied to a second input of the amplifier.

6. The power converter according to claim 5, wherein the first track amplifier circuit comprises a current controlled current source CCCS and a resistive element, and wherein the first track amplifier circuit is configured to generate the voltage indicative of the first error current by
   generating, using the CCCS, an intermediate current associated with the first error current, and
   translating, using the resistive element, said intermediate current into said voltage indicative of the first error current.

7. The power converter according to claim 4, further comprising a first clamp circuit configured to limit the first voltage of the first capacitive element to a first threshold value.

8. The power converter according to claim 7, wherein the first clamp circuit comprises
   a transistor coupled between the first capacitive element and a reference potential, and
   an error amplifier coupled to a control terminal of the transistor, wherein the error amplifier is configured to compare the first voltage of the first capacitive element and the first threshold value.

9. The power converter according to claim 8, wherein the first track amplifier circuit further comprises a current mirror and another transistor, wherein
   a first branch of the current mirror is coupled between the supply rail and the control terminal of the charging transistor,
   a second branch of the current mirror is coupled on a current path from the supply rail, via a controlled section of the another transistor to a reference potential, and
   a control terminal of the another transistor is coupled to the control terminal of the transistor of the first clamp circuit.

10. The power converter according to claim 7, wherein the first track amplifier circuit is configured to interrupt the additional current path from the supply rail to the first capacitive element when the first clamp circuit limits the first voltage of the first capacitive element to the first threshold value.

11. The power converter according to claim 1, further comprising a first threshold value generator circuit configured to generate the first threshold value dependent on the first error current.

12. The power converter according to claim 11, wherein the first threshold value generator circuit is configured to generate the first threshold value such that the first threshold value increases when the first error current increases.

13. The power converter according to claim 11, wherein the first threshold value generator circuit comprises
   a current mirror configured to generate a mirror current based on the first error current, and
   a resistive element configured to translate said mirror current into the first threshold value.

14. The power converter according to claim 13, wherein the resistive element of the first threshold value generator circuit is coupled between an output of the selector circuit and the first clamp circuit.

15. The power converter according to claim 1, wherein the selector circuit comprises a unity gain amplifier, and wherein
   the first voltage of the first capacitive element is applied to a first non-inverting input of the unity gain amplifier,
   the second voltage of the second capacitive element is applied to a second non-inverting input of the unity gain amplifier, and
   an output signal of the unity gain amplifier is feedback to an inverting input of the unity gain amplifier.

16. The power converter according to claim 1, further comprising
   a modulator circuit configured to generate, based on the selection signal, one or more control signals for controlling a power stage of the power converter.

17. The power converter according to claim 1, further comprising a high-side switching element, a low-side switching element, and an inductor, wherein
   the high-side switching element is coupled to a switching node,
   the low-side switching element is coupled between the switching node and a reference potential, and
   the inductor is coupled to the switching node.

18. A method of operating a power converter, wherein the power converter comprises a first capacitive element, a second capacitive element, and wherein the method comprises
   generating based on a first reference value and a first feedback signal, a first error current for charging the first capacitive element, generating based on a second reference value and a second feedback signal, a second error current for charging the second capacitive element, generating a selection signal by comparing a first voltage of the first capacitive element and a second voltage of the second capacitive element, and establishing an additional current path from a supply rail to the first capacitive element for accelerated charging of said first capacitive element.

19. The method according to claim 18, further comprising not establishing the additional current path from the supply rail to the first capacitive element if the selection signal indicates that the first error current is used to control a power stage of the power converter.

20. The method according to claim 18, further comprising establishing the additional current path from the supply rail to the first capacitive element if a difference between the first reference value and the first feedback signal exceeds a predetermined activation threshold.

21. The method according to claim 20, further comprising providing a charging transistor coupled between the supply rail and the first capacitive element.

22. The method according to claim 21, wherein a first track amplifier circuit further comprises an amplifier, and wherein the method comprises coupling an output of the amplifier to a control terminal of the charging transistor, applying a voltage indicative of the first error current to a first input of the amplifier, and applying a voltage associated with the predetermined activation threshold to a second input of the amplifier.

23. The method according to claim 22, wherein a first track amplifier circuit comprises a current controlled current source CCCS and a resistive element, and wherein the method comprises generating the voltage indicative of the first error current by generating, using the CCCS, an intermediate current associated with the first error current, and translating, using the resistive element, said intermediate current into said voltage indicative of the first error current.

24. The method according to claim 21, further comprising limiting, by a first clamp circuit, the first voltage of the first capacitive element to a first threshold value.

25. The method according to claim 24, comprising coupling a transistor between the first capacitive element and a reference potential, and coupling an error amplifier to a control terminal of the transistor, wherein the error amplifier is configured to compare the first voltage of the first capacitive element and the first threshold value.

26. The method according to claim 25, wherein a first track amplifier circuit further comprises a current mirror and another transistor, and wherein the method comprises coupling a first branch of the current mirror between the supply rail and the control terminal of the charging transistor, coupling a second branch of the current mirror on a current path from the supply rail, via a controlled section of the another transistor to a reference potential, and coupling a control terminal of the another transistor to the control terminal of the transistor of the first clamp circuit.

27. The method according to claim 24, comprising interrupting the additional current path from the supply rail to the first capacitive element when the first clamp circuit limits the first voltage of the first capacitive element to the first threshold value.

28. The method according to claim 18, further comprising generating, by a first threshold value generator circuit, the first threshold value dependent on the first error current.

29. The method according to claim 28, comprising generating, by the first threshold value generator circuit, the first threshold value such that the first threshold value increases when the first error current increases.

30. The method according to claim 28, comprising generating, by a current mirror, a mirror current based on the first error current, and translating, by a resistive element, said mirror current into the first threshold value.

31. The method according to claim 30, comprising coupling the resistive element between an output of a selector circuit and the first clamp circuit.

32. The method according to claim 18, wherein a selector circuit comprises a unity gain amplifier, and wherein the method comprises applying the first voltage of the first capacitive element to a first non-inverting input of the unity gain amplifier, applying the second voltage of the second capacitive element to a second non-inverting input of the unity gain amplifier, and feedbacking an output signal of the unity gain amplifier to an inverting input of the unity gain amplifier.

33. The method according to claim 18, further comprising generating, by a modulator circuit, based on the selection signal, one or more control signals for controlling a power stage of the power converter.

34. The method according to claim 18, wherein the power converter further comprises a high-side switching element, a low-side switching element, and an inductor, and wherein the method comprises coupling the high-side switching element to a switching node, applying the low-side switching element between the switching node and a reference potential, and applying the inductor to the switching node.

* * * * *